United States Patent [19]
Hama et al.

[11] Patent Number: 5,692,784
[45] Date of Patent: Dec. 2, 1997

[54] TUBING JOINT

[75] Inventors: Tomio Hama; Kiyoyasu Yamazaki, both of Okaya, Japan

[73] Assignee: Kabushiki Kaisha Nihon Pisco, Nagano-ken, Japan

[21] Appl. No.: 655,642

[22] Filed: May 30, 1996

[30] Foreign Application Priority Data

Jun. 2, 1995 [JP] Japan .................. 7-136549

[51] Int. Cl.⁶ ..................... F16L 37/08
[52] U.S. Cl. ............ 285/308; 285/105; 285/340
[58] Field of Search ............... 285/308, 340, 285/105

[56] References Cited

U.S. PATENT DOCUMENTS

2,910,311  10/1959  Carr ........................ 285/308 X
4,593,943  6/1986  Hama et al. ............... 285/340 X
5,356,181  10/1994  Shirogone et al. .......... 285/308 X Primary Examiner—Dave W. Arola
Attorney, Agent, or Firm—Birch, Stewart Kolasch & Birch, LLP

[57] ABSTRACT

A tubing joint having a long life span, in which stress concentration can be avoided even if external force from the tube repeatedly works on the ring claw. In the tubing joint of the present invention, the ring claw is formed into a zigzag shape with outer notch sections and inner notch sections. The ring claw has a plurality of outer ring sections, a plurality of inner ring sections, each of which is provided between adjacent outer ring sections, and a plurality of connecting sections, each of which connects an end of the inner ring section with an end of the outer ring section. The outer notch sections are substantially formed into a U-shape, and inner edges of adjacent connecting sections, which mutually face and form each U-shaped outer notch section, are arranged parallel and substantially perpendicular to the outer edge of the ring claw.

7 Claims, 5 Drawing Sheets

TUBING JOINT

BACKGROUND OF THE INVENTION

The present invention relates to a tubing joint.

Many types of tubing joints are used for connecting tubes with pressure equipments.

Figure 6:
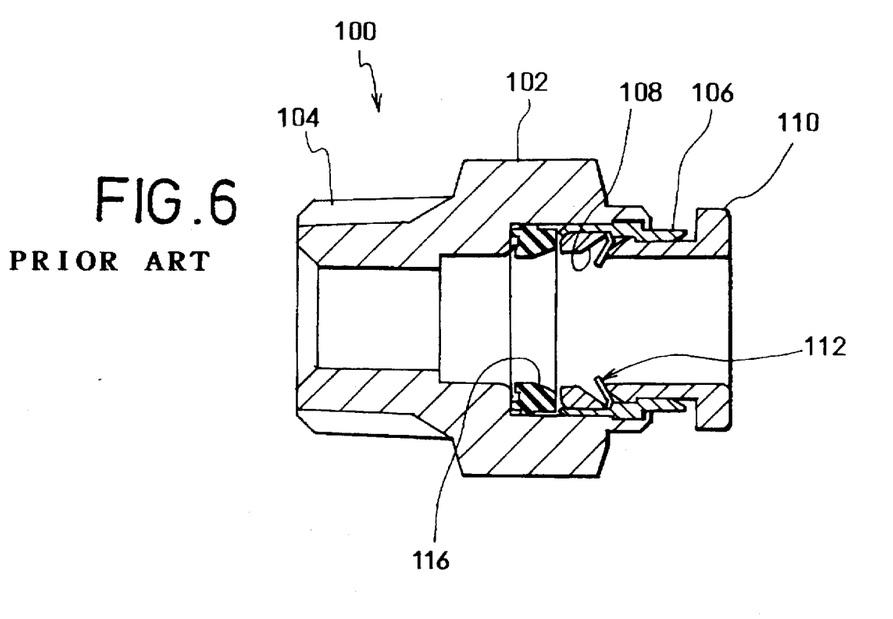
FIG. 6 is a side sectional view of the conventional tubing joint.

A conventional tubing joint 100, which has been widely used, is shown in FIG. 6, which is a front sectional view. The constitution of the conventional tubing joint 100 will be explained with reference to FIG. 6.

A cylindrical joint body 102 has a screw section 104, which is provided on a left end section, and which is capable of fixing the tubing joint 100 to pressure equipment (not shown). The joint body 102 is made by cutting, so it is generally made of a metal whose cutting machinability is high, e.g., brass.

A left end section of a guide cylinder section 106 is inserted in a right end section of the joint body 102, and fixed therein by caulking. The guide cylinder section 106 is also made of the metal whose cutting machinability is high, e.g., brass.

A ring stopper 108 is also made of the metal whose cutting machinability is high, e.g., brass. The stopper 108 is fixed in the left end section of the guide cylinder section 106 by caulking.

A release cylinder 110 is made of a plastic. The release cylinder 110 is slidably fitted in the right end section of the guide cylinder section 106, and is capable of moving in the axial direction.

A ring claw 112 is made of a thin (about 0.2 mm) metal plate, e.g., phosphor bronze, having sufficient elasticity. The ring claw 112 is located on the right side of the stopper 108, in the guide cylinder section 106.

Figure 7:
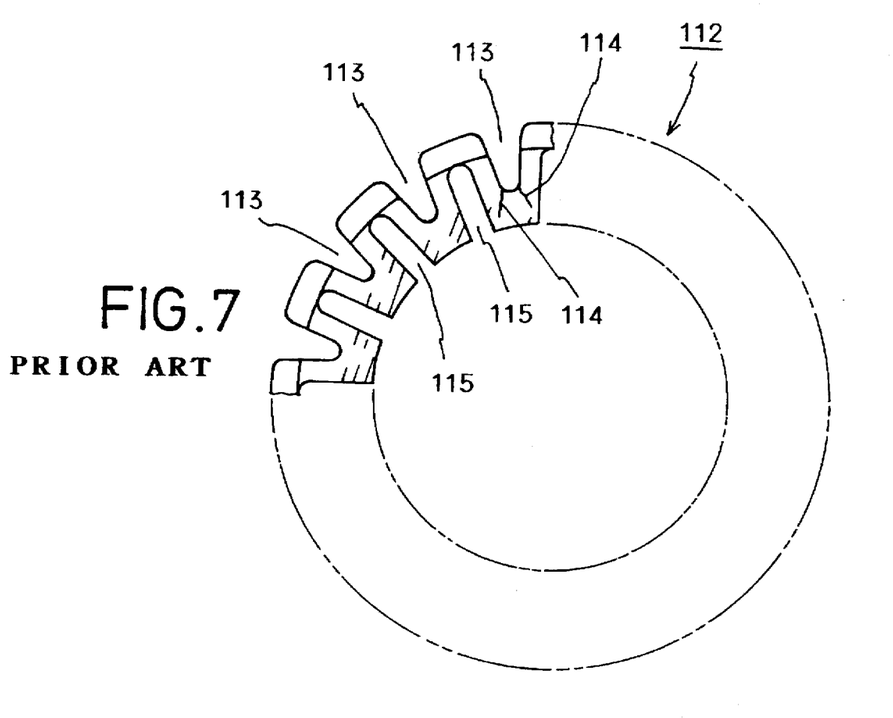
FIG. 7 is a front view of the conventional ring claw.

As shown in FIG. 7, the ring claw 112 has a plurality of V-shaped outer notch sections 113, which are radially formed from the outer edge toward a center, and a plurality of inner notch sections 115, which are radially formed from an inner edge toward the outer edge. The outer notch sections 113 and the inner notch sections 115 are alternately arranged, in the circumferential direction, to form the ring claw 112 into a zigzag ring shape. An outer edge of the ring claw 112 is bent in the direction of tube-insertion (leftward) and held in a ring groove 106a formed in the guide cylinder section 106 (see FIG. 8). The inner edge of the ring claw 112 is capable of biting an outer circumferential face of a tube 130 (see FIG. 8), which has been inserted in the joint body 102, to prevent the tube 130 from moving in the direction of tube withdrawal (rightward).

When the release cylinder 110 is pushed into the guide cylinder section 106, the inner edge of the ring claw 112 is pushed toward the stopper 108 by an inner end of the release cylinder 110, so that the inner edge of the ring claw 112 releases the tube 130. By releasing the tube 130, the tube 130 can be pulled out from the tubing joint 100.

A seal ring 116, which is made of rubber, tightly contacts the outer circumferential face of the tube 130 so as to prevent fluid from leaking therefrom.

However, the conventional tubing joint 100 has the following disadvantage.

When pressurized fluid is introduced into the plastic tube 130 which has been attached to the pressure equipment, the outer diameter of the tube 130 is changed according to the change of fluid pressure. By changing the fluid pressure in the tube 130, the external force from the tube 130, whose magnitude continuously changes, always works to the inner edge of the ring claw 112. Namely, the inner edge of the ring claw 112 is always moved in the direction of arrow X (see FIG. 8).

Figures 5, 8:
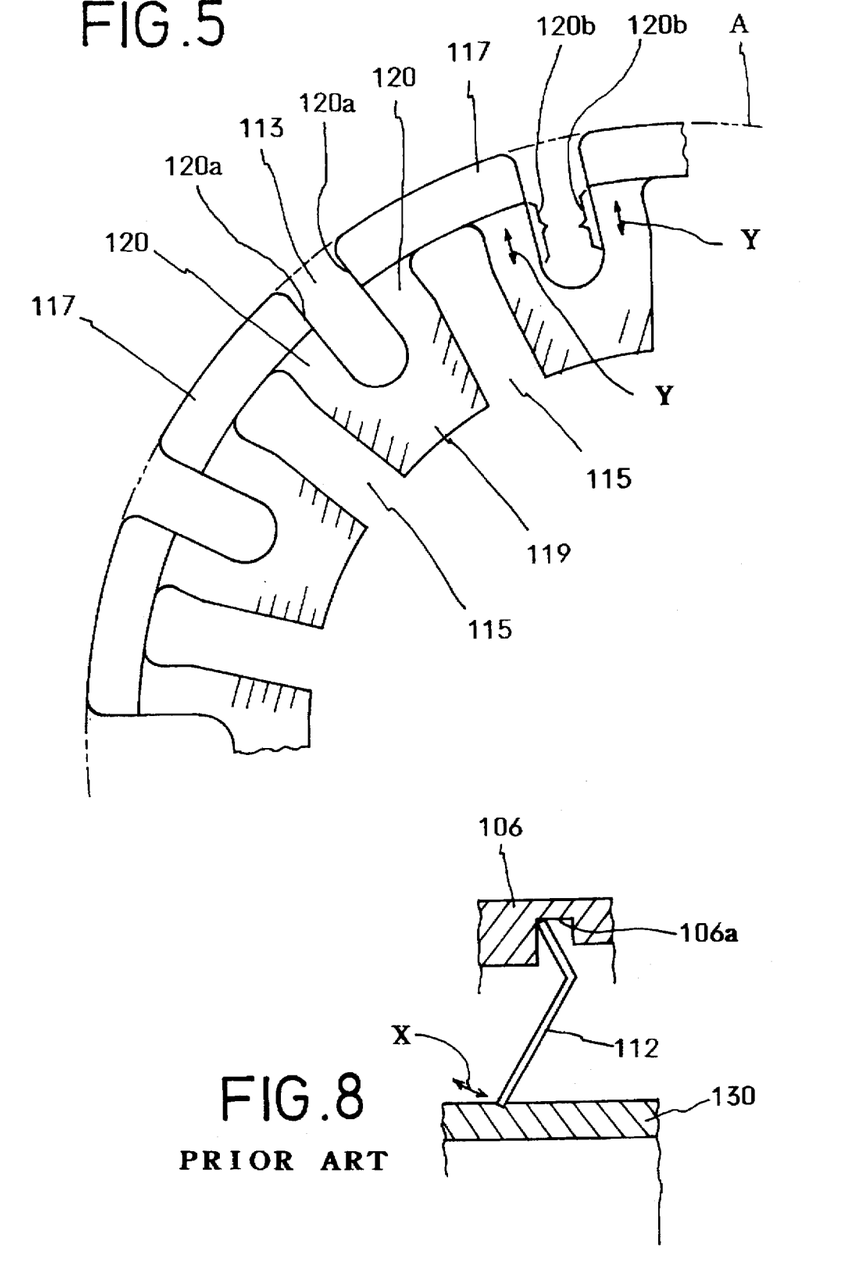
FIG. 5 is a partial enlarged view of the ring claw.
FIG. 8 is a partial sectional view in the vicinity of the ring claw shown in FIG. 7.

On the other hand, the outer edge of the ring claw 112 contacts an inner face of the ring groove 106a of the guide cylinder section 106, so its movement is limited. With this structure, the V-shaped spaces or the V-shaped outer notch sections 113 are opened and closed when the inner edge of the ring claw 112 is moved in the direction of the arrow X.

If a specific V-shaped outer notch section 113 is opened and closed, stress concentration is repeated in the specific outer notch section 113, so that cracks 114 form in parts corresponding to innermost parts of the specific outer notch section 113 (see FIG. 7). Then the ring claw 112 will be broken along the cracks 114.

SUMMARY OF THE INVENTION

An object of the present invention is to provide a tubing joint having a long span of life, in which stress concentration can be avoided even if external force from the tube repeatedly works on the ring claw.

To achieve the object, the tubing joint of the present invention comprises:

a joint body being formed into a cylindrical shape;

a ring claw being made of an elastic plate material, an outer edge of the ring claw being bent in the direction of tube-insertion and being held in a ring groove formed in the joint proper, the ring claw having a plurality of outer notch sections, which are radially formed from the outer edge toward a center and which include a pair of spaced-apart parallel sidewall portions interconnected by a semicircular connecting portion, and a plurality of inner notch sections, which are radially formed from an inner edge toward the outer edge, the outer notch sections and the inner notch sections being alternately arranged to form the ring claw into a zigzag ring shape, wherein the inner edge of the ring claw is capable of biting an outer circumferential face of a tube, which has been inserted in the joint body, to prevent the tube from moving in the direction of tube-withdrawal; and a release cylinder being provided in the joint body and being capable of sliding in the axial direction, the release cylinder being capable of pushing the inner edge of the ring claw to release the tube, wherein the ring claw, which is formed into the zigzag ring shape, has:
  a plurality of outer ring sections;
  a plurality of inner ring sections, each of which is provided between adjacent outer ring sections; and
  a plurality of connecting sections, each of which connects an end of the inner ring section with an end of the outer ring section, which corresponds to the end of the inner ring section, wherein the outer notch sections are substantially formed into a U-shape, and wherein inner edges of adjacent connecting sections, which mutually face and form each U-shaped outer notch section, are arranged parallel and substantially perpendicular to the outer edge of the ring claw.

In the present invention, the inner edges of the adjacent connecting sections, which mutually face and form each U-shaped outer notch section, are arranged parallel and substantially perpendicular to the outer edge of the ring claw. So external force, which is caused by pressure change in the tube, is vertically transmitted to the ring groove via the connecting sections and the outer ring sections, so that the external force does not act as a force opening and closing the U-shaped outer notch sections. With this structure, the stress concentration in the connecting sections can be prevented, and the life span of the ring claw or the tubing joint can be outstandingly extended.

Each connecting section may have a part of substantially fixed width. By the fixed width part, the stress concentration can be effectively avoided, and the life span can be further extended.

The positions of bending the outer edge of the ring claw may be located along a virtual circular line connecting innermost parts of the inner notch sections.

The joint body may include: a cylindrical base section; and a guide cylinder section whose one end is connected with one end of the cylindrical base section, wherein the ring claw is provided in the guide cylinder section, the release cylinder is slidably fitted in the other end of the guide cylinder section, and the guide cylinder section and the release cylinder are made by drawing metal materials. In the case of making the guide cylinder section and the release cylinder by drawing the metal materials, they can be made in a shorter time than the case of making the same by cutting, so that manufacturing cost of the tubing joint can be reduced.

The release cylinder may have a plurality of engage holes, which are formed in an outer circumferential face of an inner part and arranged in the circumferential direction, and each of which is elongated in the axial direction. The guide cylinder section may have a plurality of engage pieces, which are extended radially inward, and which are capable of respectively engaging with the engage holes so as to limit the axial movement of the release cylinder.

Further, the engage pieces may be tongue pieces, which are formed by cutting parts of the other end of the guide cylinder section and bending radially inward.

The one end of the guide cylinder section may be formed into a large diameter section, which is capable of covering over the one end of the base section, and the outer edge of the ring claw may be held in the ring groove, which is formed between one end face of the base section and an inner face of the large diameter section of the guide cylindrical section.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

An embodiment of the present invention will now be described by way of examples and with reference to the accompanying drawings, in which.

DETAILED DESCRIPTION OF THE PREFERRED EMBODIMENT

The preferred embodiment of the present invention will now be described in detail with reference to the accompanying drawings.

Firstly, the construction of a tubing joint 10 will be explained with reference to FIGS. 1–4.

Figure 1:
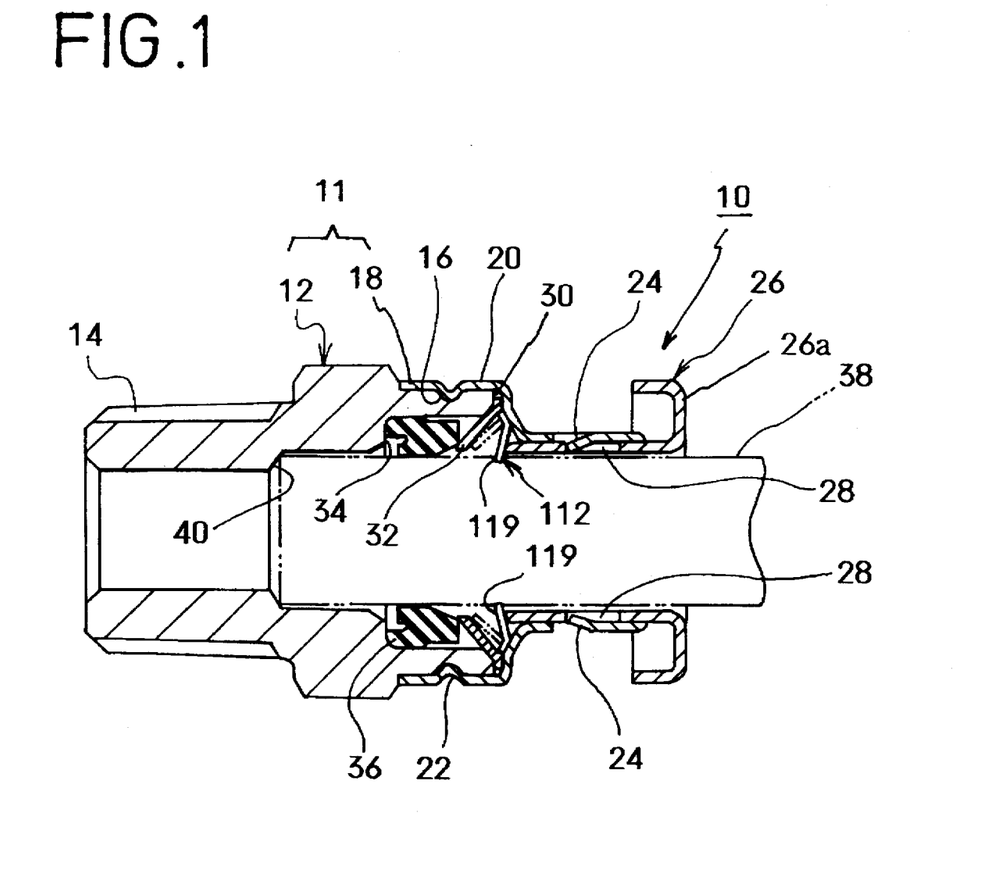
FIG. 1 is a side sectional view of a tubing joint of the embodiment of the present invention.
Figure 2:
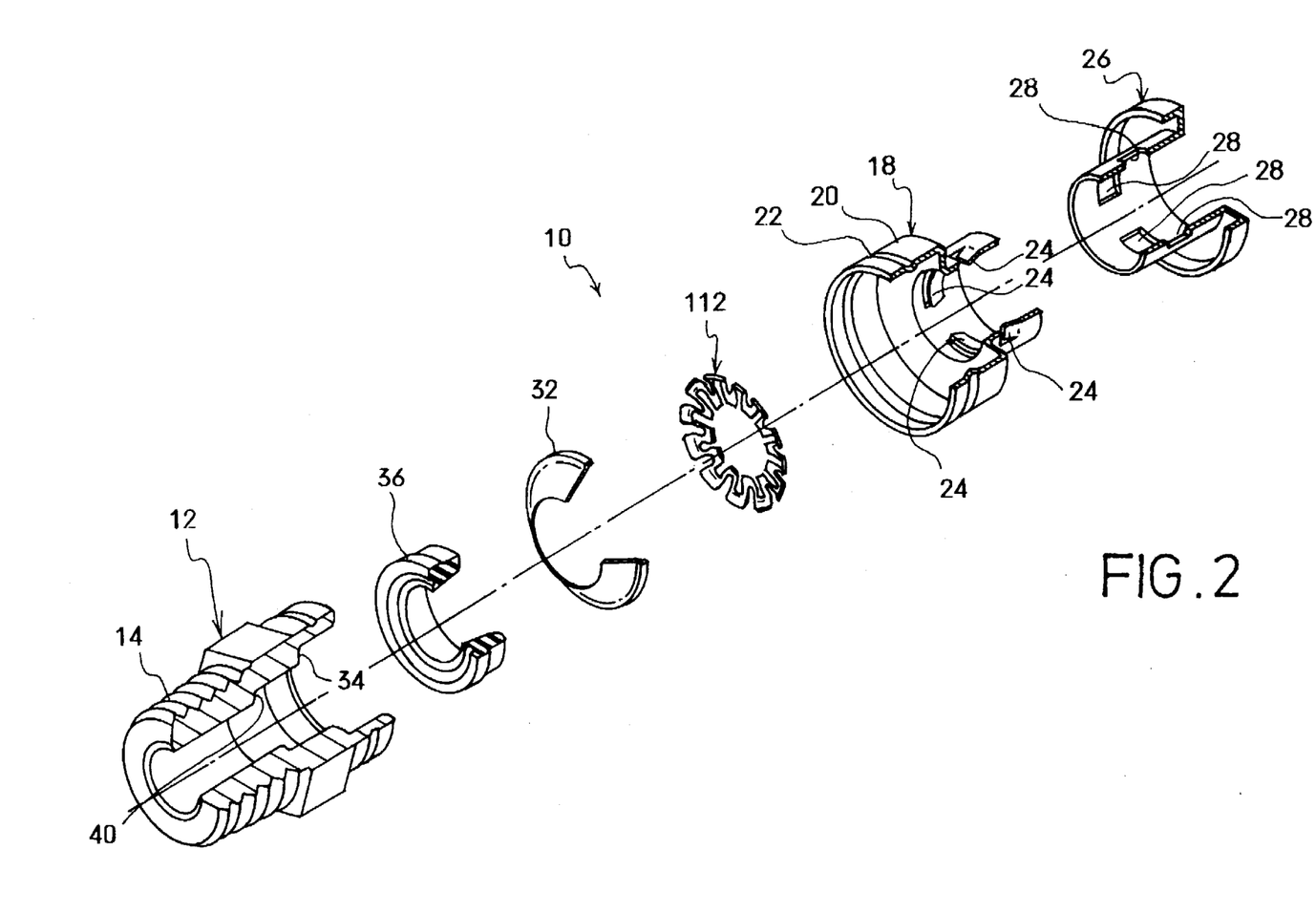
FIG. 2 is a exploded perspective view of the tubing joint shown in FIG. 1.

A base section 12 is formed into a cylindrical shape. A screw section 14, which is threadably attachable to pressure equipment (not shown) to fix the tubing joint 10 thereto, is formed on an outer circumferential face of a left end section of the base section 12. There is formed a circular groove 16 on an outer circumferential face of a right end section of the base section 12. The base section is made by cutting, so it is generally made of a metal whose cutting machinability is high, e.g., brass. The right end section of the base section 12 includes a guide cylinder section 18 (described later) connected thereto, which may be a plastic cylinder.

The guide cylinder section 18 may also be made by drawing a stainless steel plate. One end section (a left end section in FIGS. 1 and 2) of the guide cylinder section 18 is a large diameter section 20, which is capable of fitting and covering over the outer circumferential face of the right end section of the base section 12. There is formed a circular projection 22, which projects inward to fit in the circular groove 16 of the base section 12, on an inner circumferential face of the large diameter section 20. The circular projection 22 runs around the inner circumferential face, but a plurality of projections may be formed and arranged, in the circumferential direction, on the inner circumferential face. The right end section of the base section 12 is press fitted into the large diameter section 20 to connect the base section 12 with the guide cylinder section 18.

On the other hand, there is formed engage pieces 24, which are extended radially inward, in the other end section (a right end section in FIGS. 1 and 2) of the guide cylinder section 18. The engage pieces 24 are formed by cutting parts of the other end section to make a plurality of tongue pieces, and bending left ends of the tongue pieces radially inward. In the present embodiment, the engage pieces 24 are formed by cutting the parts of the other end section in a U-shape so as to form the engage pieces 24 into a rectangular shape, but they may be formed into other shapes, such as a triangular shape, a half circle shape, etc. Free ends of the engage pieces 24 are capable of elastically moving in an arcuate path.

The base section 12 and the guide cylinder section 18 constitute a joint body 11 in the present embodiment.

A release cylinder 26 is made by drawing a stainless steel plate. The outer diameter of the release cylinder 26 is slightly shorter than the inner diameter of the right end section of the guide cylinder section 18. The release cylinder 26 is inserted in the right end section of the guide cylinder section 18, and it is capable of sliding in the axial direction therein. The release cylinder 26 has a plurality of engage holes 28, which are formed in an outer circumferential face of a part in the guide cylinder section 18 and which are arranged in the circumferential direction. Number of the engage holes 28 is equal to that of the engage pieces 24.

Each engage hole 28 is arranged to respectively engage with the engage pieces 24. The engage holes 28 are elongated in the axial direction. There is formed a flange section 26a at right end of the release cylinder 26.

To fit the release cylinder 26 into the guide cylinder section 18, the release cylinder 26 is inserted into the guide cylinder section 18 from its right side. When the release cylinder 26 is inserted thereinto, the left end section of the release cylinder 26 moves the free ends of the engage pieces 24 radially outward against their elasticity. When the release cylinder 26 is further inserted into the guide cylinder section 18 and the engage holes reach the free ends of the engage pieces 24, the engage pieces 24, which have been elastically moved radially outward, respectively engage with the engage holes 28 by their own elasticity. By engaging the engage pieces 24 with the engage holes 28, the release cylinder 26 can be securely held in the guide cylinder section 18. Since the engage holes 28 are elongated in the axial direction, the axial movement of the release cylinder 26 is limited to the longitudinal length of the engage holes 28.

Note that, the engage holes may be provided in the guide cylinder section 18 instead of the engage pieces 24, and the release cylinder 26 may have the engage pieces for engaging with said engage holes.

Figure 3:
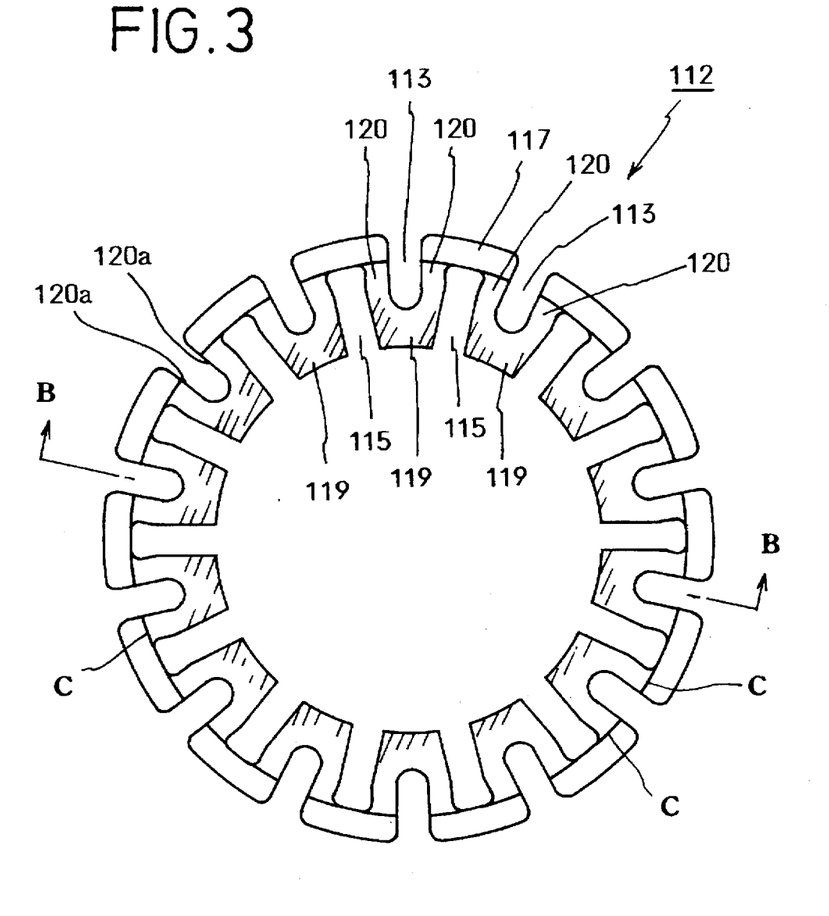
FIG. 3 is a front view of a ring claw shown in FIG. 1.
Figure 4:
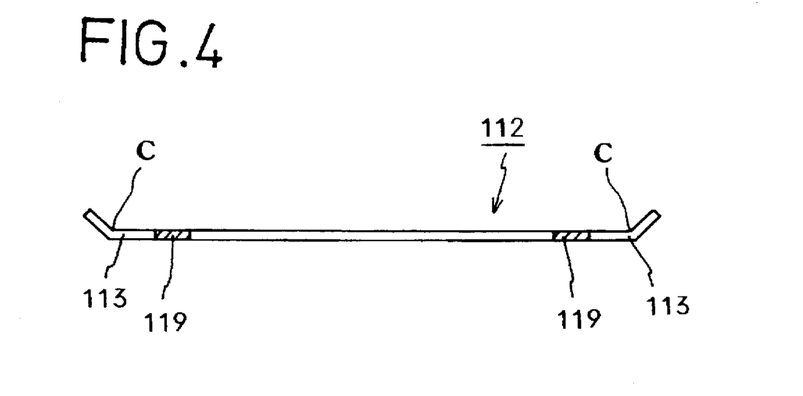
FIG. 4 is a sectional view taken along a line B—B in FIG. 3.

A ring claw 112 is shown in FIGS. 3 and 4.

The ring claw 112 is made of a metal ring plate, e.g., stainless steel. The ring claw 112 is made by forming a plurality of outer notch sections 113, which are radially formed from the outer edge toward a center, and a plurality of inner notch sections 115, which are radially formed from an inner edge toward the outer edge. The outer notch sections 113 and the inner notch sections 115 are alternately arranged to form the ring claw 112 into a zigzag ring shape. By forming the zigzag ring shape, the ring claw 112 has a plurality of outer ring sections 117, a plurality of inner ring sections 119, each of which is provided between adjacent outer ring sections 117, and a plurality of connecting sections 120, each of which connects an end of the inner ring section 119 with an end of the outer ring section 117, which corresponds to said end of the inner ring section 119. In the present invention, the outer notch sections 113 are substantially formed into the U-shape, so that inner edges 120a of adjacent connecting sections 120, which mutually face and form each U-shaped outer notch section 113, are arranged parallel and substantially perpendicular to the outer edge A of the ring claw 112. Note that, connecting portions between each outer ring section 117 and each connecting section 120 have round corners.

Preferably, each connecting section 120 has a part 120b, which has substantially fixed width (see FIG. 5). Further, it is preferable to make the fixed width part 120b as long as possible.

Outer edges of the outer ring sections 117, which have a prescribed width, are bent in the direction of tube-insertion or axially inward (see FIG. 4). As clearly shown in FIG. 3, positions C of bending the outer edge of the outer ring sections 117 are preferably located along a virtual circular line connecting innermost parts of the inner notch sections 115.

The outer edges, which have been bent, of the ring claw 112 are held in a ring groove 30, which is formed between a right end face of the base section 12 (or a right end face of a stopper 32) and an inner end face of the large diameter section 20.

A stopper 32 is formed into a tapered ring. The stopper 32 is also made by drawing a stainless steel plate. An outer edge of the stopper 32 is pinched by the right end face of the base section 12 and the inner end face of the large diameter section 20, so that it is fixed in the guide cylinder section 18. When the inner edge (the inner ring sections 119) of the ring claw 112 is pushed axially inward by the end of the release cylinder 26, the inner ring sections 119 or the connecting sections 120 contact a right end face of the stopper 32. By the contact, deformation of the connecting sections 120 are limited so as not to deform beyond their elastic limit. The inner diameter of the stopper 32 is gradually made smaller toward the direction of the insertion of the release cylinder 26.

There is provided an elastic seal ring 36, which is made of synthetic rubber, between a first step section 34, which is formed in the base section 12 and the stopper 32.

In the tubing joint 10 having above described constitution, a tube 38 is inserted into the joint body 11 via the release cylinder 26. The tube 38 pushes to move the inner ring sections 119 of the ring claw 112 radially outward against the elasticity of the connecting sections 120. The tube 38 is inserted until its front end contacts a second step section 40 in the base section 12.

During the insertion of the tube 38, since the outer edge or the outer ring sections 117 of the ring claw 112 are bent inward, the outer edge or the outer ring sections 117 contact an inner face of the ring groove 30. By the contact, the ring claw 112 is not moved inward together with the tube 38. Since the inner ring sections 119 of the ring claw 112 diagonally contact an outer circumferential face of the tube 38, edges of the inner ring sections 119 bite the outer circumferential face of the tube 38 when the tube 38 is pulled axially outward, so that the tube 38 is securely held in the tubing joint 10.

In the case where pressurized fluid is introduced into the tube 38, the outer diameter of the tube 38 is changed by changing the fluid pressure.

In this case, the inner ring sections 119 and the connecting sections 120 are repeatedly bent in the direction of the arrow X shown in FIG. 8 by external force from the tube 38, similarly to the conventional tubing joint, which has been explained with reference to FIG. 8.

When the inner ring sections 119 and the connecting sections 120 are bent, force from the sections 119 and 120 biases the edges of the outer ring sections 117 onto the inner face of the ring groove 30.

In the conventional ring claw, as described above, the outer notch sections are formed into the V-shape which is made broader toward outside, so the V-shaped outer notch sections are opened and closed when the edges of the outer ring sections are repeatedly biased onto the inner face of the ring groove.

On the other hand, in the present embodiment, the outer notch sections 113 are substantially formed into the U-shape, and the inner edges 120a of the adjacent connecting sections 120, which mutually face and form each U-shaped outer notch section 113, are arranged parallel and substantially perpendicular to the outer edge of the ring claw 112. With this structure, the external force Y (see FIG. 5) working to the ring groove 30 via the connecting sections 120 and the outer ring sections 117 is perpendicularly directed with respect to contact points in the ring groove 30, so that the external force does not open and close the U-shaped outer notch sections 113. Without opening and closing the U-shaped outer notch sections 113, the stress concentration, which breaks the ring claw of the conventional tubing joint, can be avoided.

A rupture test, whose conditions were harder than those according to the Japan Industrial Standard, was executed with the conventional ring claw and the ring claw 112 of the present embodiment. The conventional claw was broken when external force was applied about 500,000 times. On the other hand, the ring claw 112 of the present embodiment was not broken in spite of applying the external force more than 1,000,000 times. So the ring claw 112 of the present embodiment has outstanding durability.

Note that, by employing the fixed width sections 120b in the connecting sections 120, the force from the inner ring sections 119 is not divided, so the stress concentration can be avoided more effectively. Namely, the durability can be further improved.

To detach the tube 38 from the tubing joint 10, the release cylinder 26 is moved axially inward (leftward) to move the inner ring sections 119 of the ring claw 112, so that the edges of the inner ring sections 119 release the tube 38. By releasing the tube 38, the tube 38 can be pulled out from the tubing joint 10.

By forming the guide cylinder section 18 and the release cylinder 26 by drawing metal plates, they can be made in shorter time than in the case of making them by cutting. By the drawing, materials which are difficult to cut, e.g., stainless steel, can be employed, so that rusting in the sliding members (the guide cylinder section 18 and the release cylinder 26), which are apt to rust, can be prevented. Without rusting, the life span of the tubing joint 10 can be extended.

In the present invention, the joint body 11 need not have two members. The base section 12 and the guide cylinder section 18 may be integrally formed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tubing joint comprising:

a joint body having a cylindrical shape;

a ring claw comprising an elastic plate material, an outer edge of said ring claw including a bent portion bent in tube-admitting direction and located in a ring groove formed in said joint body, said ring claw having a plurality of radially directed U-shaped outer notch sections extending from the outer edge toward a center of the ring claw, said U-shaped outer notch sections including a pair of spaced-apart parallel sidewall portions interconnected by a semi-circular connecting portion, said ring claw further having a plurality of radially directed inner notch sections extending from an inner edge of the ring claw toward the outer edge, the outer notch sections and the inner notch sections being alternately arranged, wherein the inner edge of said ring claw is arranged to bite an outer circumferential face of a tube which has been inserted in said joint body, to prevent the tube from moving in the direction of a tube-withdrawal; and a release cylinder located in said joint body and axially slidable therein for pushing the inner edge of said ring claw to release the tube;

wherein said ring claw has:

a plurality of outer ring sections;

a plurality of inner ring sections, each of which is provided between adjacent outer ring sections; and a plurality of connecting sections, each of which connects an end of one of said inner ring sections with an end of one of said outer ring sections which corresponds to the end of said inner ring section, and wherein inner edges of adjacent connecting sections, which mutually face one another and form said sidewall portions of each U-shaped outer notch section, are arranged parallel to one another and substantially perpendicular to the outer edge of said ring claw.

2. The tubing joint according to claim 1, wherein a portion of each connecting section has a substantially fixed width.

3. The tubing joint according to claim 1, wherein positions of bending the outer edge of said ring claw are located along a virtual circular line connecting innermost parts of the inner notch sections.

4. The tubing joint according to claim 1, wherein said joint body includes:

a cylindrical base section; and a guide cylinder section whose one end is connected with one end of said cylindrical base section, wherein said ring claw is provided in said guide cylinder section, and wherein said release cylinder is slidably fitted in the other end of said guide cylinder section.

5. A tubing joint comprising:

a joint body having a cylindrical shape;

a ring claw comprising an elastic plate material, an outer edge of said ring claw including a bent portion bent in tube-admitting direction and located in a ring groove formed in said joint body, said ring claw having a plurality of radially directed U-shaped outer notch sections extending from the outer edge toward a center of the ring claw, said U-shaped outer notch sections including a pair of spaced apart parallel sidewall portions interconnected by a semi-circular connecting portion, said ring claw further having a plurality of radially directed inner notch sections extending from an inner edge of the ring claw toward the outer edge, the outer notch sections and the inner notch sections being alternately arranged, wherein the inner edge of said ring claw is arranged to bite an outer circumferential face of a tube which has been inserted in said joint body, to prevent the tube from moving in the direction of a tube-withdrawal; and a release cylinder located in said joint body and axially slidable therein for pushing the inner edge of said ring claw to release the tube;

wherein said ring claw has:

a plurality of outer ring sections;

a plurality of inner ring sections, each of which is provided between adjacent outer ring sections; and a plurality of connecting sections, each of which connects an end of one of said inner ring sections with an end of one of said outer ring sections which corresponds to the end of said inner ring section, and wherein inner edges of adjacent connecting sections, which mutually face one another and form said sidewall portions of each U-shaped outer notch section, are arranged parallel to one another and substantially perpendicular to the outer edge of said ring claw, wherein said joint body includes:

a cylindrical base section; and a guide cylinder section whose one end is connected with one end of said cylindrical base section, wherein said ring claw is provided in said guide cylinder section, wherein said release cylinder is slidably fitted in the other end of said guide cylinder section, wherein said release cylinder has a plurality of engage holes, which are formed in an outer circumferential face of an inner part and arranged in the circumferential direction, and each of which is elongated in the axial direction, and wherein said guide cylinder section has a plurality of engage pieces, which are extended radially inward, and which respectively engage with the engage holes so as to limit the axial movement of said release cylinder.

6. The tubing joint according to claim 5, wherein said engage pieces are tongue pieces, which are partially cut away from the other end of said guide cylinder section and bent radially inward.

7. The tubing joint according to claim 6, wherein the one end of said guide cylinder section is formed into a large diameter section, which covers the one end of said base section, and wherein the outer edge of said ring claw is held in the ring groove between one end face of said base section and an inner face of the larger diameter section of said guide cylindrical section.

* * * * *